April 1, 1952 W. D. RICH 2,591,607
MOLD
Filed Aug. 23, 1950 2 SHEETS—SHEET 2
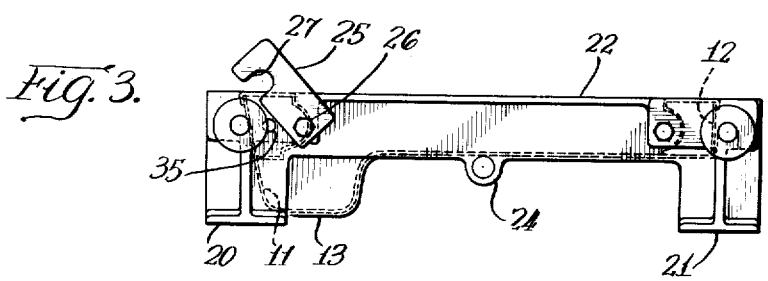
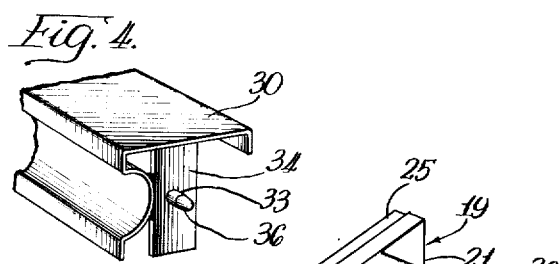
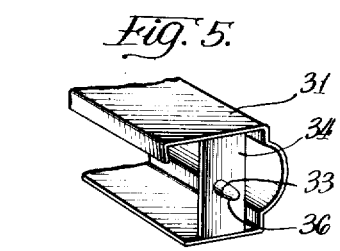
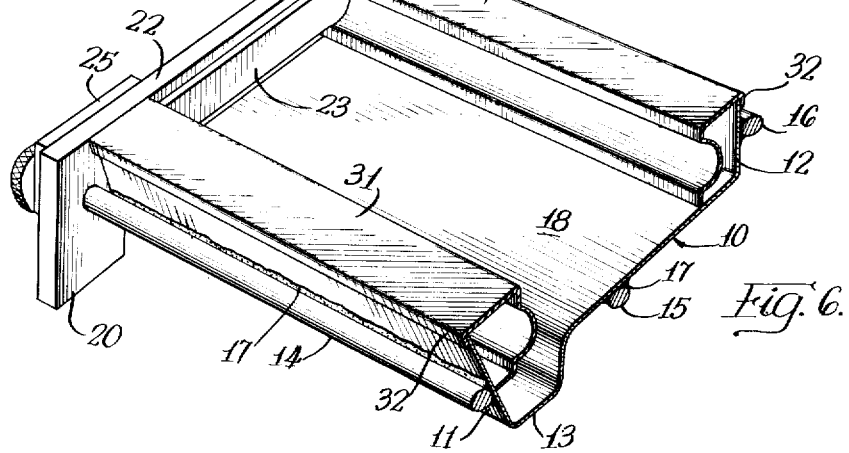
INVENTOR.
William D. Rich
BY
Attys.

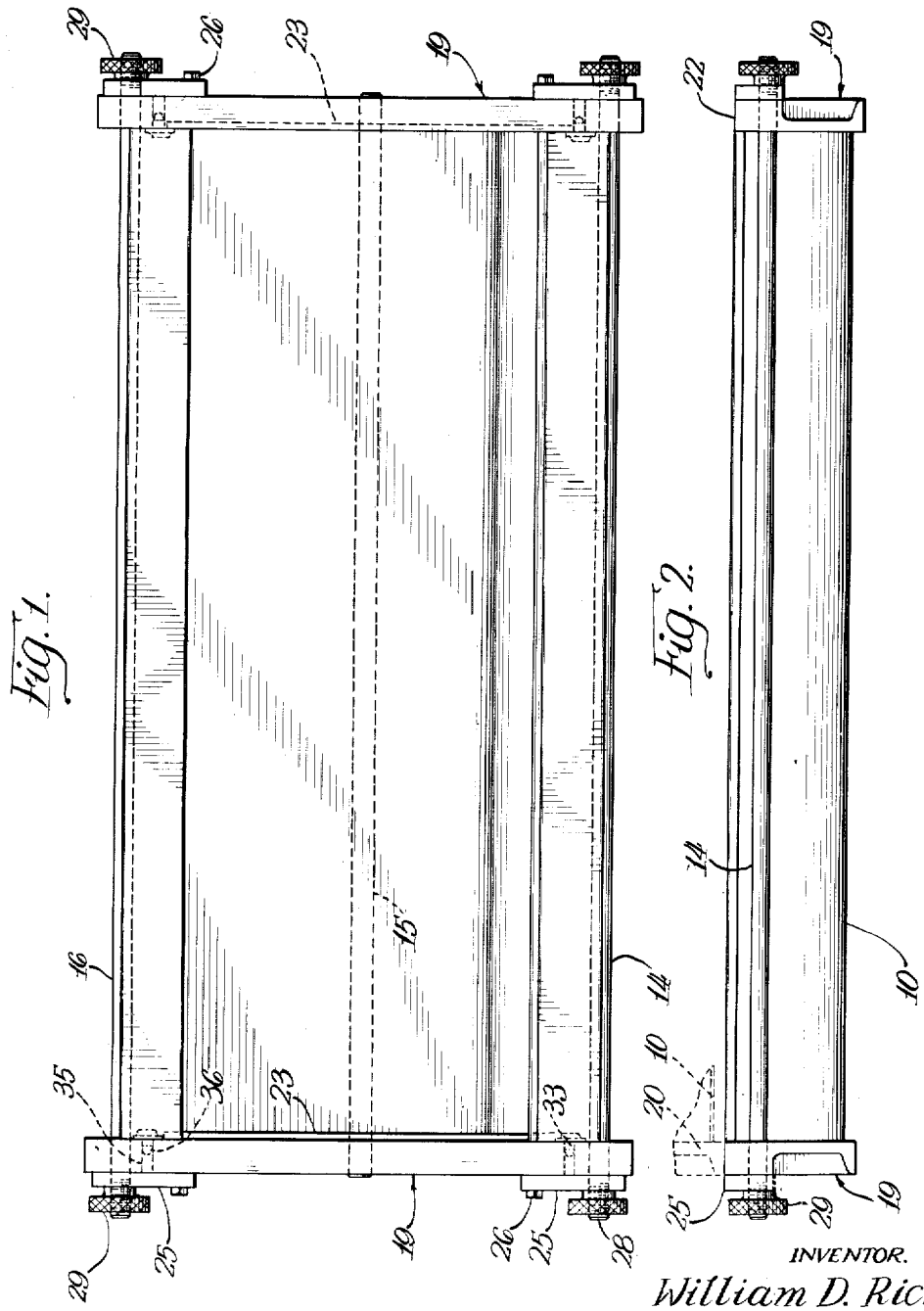

Patented Apr. 1, 1952

2,591,607

UNITED STATES PATENT OFFICE 2,591,607

MOLD

William D. Rich, Elgin, Ill.

Application August 23, 1950, Serial No. 181,033

4 Claims. (Cl. 25—121)

For many years cement silo staves have been formed in molds having pivoted end gates, and, in order to obtain the desired rigidity, piano-type hinges have ordinarily been used for mounting the gates. Even so, the gates will frequently get out of line and much time is required to re-line the hinges in order to obtain the desired registry of the component parts of the mold. Sometimes it is necessary in the industry to shut down a plant for from four to six weeks a year in order to keep the molds in a proper state of repair and alignment.

The present invention seeks to overcome this difficulty and to provide a mold that is cheaper in initial cost, substantially easier to keep clean and to maintain in proper operating condition, easier to handle when discharging the mold, capable of stacking one on top of another without forming a flashing on the molded piece below, and which otherwise is superior to the molds now in use.

Further and other objects and advantages will become apparent as the disclosure proceeds and the description is read in conjunction with the accompanying drawings, in which Figure 1 is a plan view of a preferred form of my mold;

Figure 2 is a side elevational view of the same;

Figure 3 shows the mold in end elevation;

Figures 4 and 5 are fragmentary perspective views showing the centering pins in the ends of the tongue and groove sticks, respectively; and Figure 6 is a fragmentary perspective view showing the mold as it appears from above.

It should be understood that the preferred form of the invention has been disclosed in the drawings and will be hereinafter specifically described for the purpose of complying with section 4888 of the Revised Statutes, but that the invention may be variously modified within the scope of the appended claims.

The mold of this invention may best be described with reference to its use in forming a cement silo stave of the type disclosed in my co-pending application, Serial No. 170,147, filed June 24, 1950, and the mold comprises a pan 10 of sheet metal having upturned sides 11 and 12, the former merging with a channel-shaped depression 13 in the bottom of the pan which forms the reinforcing rib of the stave. The pan is open at both ends and can therefore be readily shaped on sheet metal forming machines.

A plurality of steel rods 14, 15 and 16 are welded to the pan 10, as indicated at 17, the rods 14 and 16 being welded to the upturned sides 11 and 12, respectively, of the pan, and the rod 15 being welded to the underside of the bottom 18 of the pan. These rods extend beyond the ends of the pan, and not only reinforce it, but also form guide rods for end gates, generally designated 19.

The end gates 19 are preferably aluminum castings which have legs 20 and 21, a smooth planar top surface 22 and a die portion 23. The legs 20 and 21 extend below the lowermost portion of the pan 10, as shown best in Figure 3, so that the molds may be stacked one above the other with the legs 20 and 21 of one mold resting upon the smooth top surface 22 of the mold beneath it. The clearance thus provided eliminates any possibility of flashings being formed on the molded cement block in the underneath mold, a difficulty which has existed in molds commonly used at the present time.

Each end gate 19 is provided with openings adapted to receive the projecting ends of the rods 14, 15 and 16, the end gate being enlarged at 24 in order to form an apertured boss for receiving the central guide rod 15.

Spacer block 25 are pivoted at 26 to the end gates, and each block is provided with a notch 27 adapted to receive the adjacent guide rod. The ends of the guide rods are threaded, as indicated at 28, and provided with knurled hand nuts 29, so that the end gates may be firmly clamped against the ends of the pan 10 but may be quickly moved away from the ends by merely unscrewing the hand nuts 29 and swinging the spacer blocks 25 about their pivots 26.

In order to form the tongue and groove side margins of the stave, the mold is provided with a concave tongue stick 30 and a convex groove stick 31, each being formed of sheet metal and each having a lip 32 adapted to engage the adjacent upper edge of the pan sides. The sticks 30 and 31 are provided at each end with centering pins 33 which are carried by a steel strap 34 welded to the ends of the sticks (see Figures 4 and 5, particularly). The centering pins 33 cooperate with openings 35 provided in the end gates and which are accurately positioned with respect to the die form 23 on the end gate. The centering pins 33 are preferably tapered slightly, as indicated at 36, so that when the tongue sticks are loosely mounted on the upturned sides 11 and 12 of the pan 10, the closing of the end gates will automatically cause the centering pins 33 to enter the openings 35 in the end gates, thereby accurately positioning the tongue and groove sticks 30 and 31 with respect to the rest of the mold.

It will be understood that in normal use of the mold, the tongue and groove sticks 30 and 31 are mounted on the sides 11 and 12 and the end gates 19 clamped against the ends of the pan 10 with the spacers 25 interposed between the hand nuts 29 and the end gates. The cement is then poured into the mold and permitted to harden. To discharge the stave from the mold, the mold is inverted and placed on a table or bench, the hand nuts 29 are then loosened allowing the spacers 25 to fall away from the guide rods 14 and 15 (the table or bench providing necessary clearance for the spacers to fall by gravity to inoperative position), whereupon the end gates may be withdrawn by a straight linear movement from the ends of the mold being guided by the guide rods 14, 15 and 16, making it possible for the mold to be lifted clear of the cement block. The tongue and groove sticks 30 and 31 naturally stay with the block as the pan 10 is lifted from the mold block, but these sticks may now be stripped from the mold by a simple outward movement of the sticks.

After the mold parts have been cleaned and lubricated (to prevent sticking of the cement to the sides of the mold), the tongue and groove sticks may be placed back in the mold, the end gates closed with the spacers again in their normal operative position between the hand nuts 29 and the end gates, and the hand nuts screwed down to firmly secure the end gates against the ends of the mold, whereupon the mold is ready for reuse.

It will be understood that the die form 23 on the end gate 19 may be a raised form or a recessed form, and in actual practice one of the end gates will have a raised form, the other a depressed form, in order to provide an interlocking tongue and groove joint for the horizontal joint between superposed staves.

One important feature of the invention resides in the fact that the end gate moves linearly away from the end of the mold, so that the die form in the end gate can form a sharp pattern line in the molded piece. With a hinged end gate, obviously, this is not possible.

I claim:

1. A mold for making cement silo staves and the like, comprising a sheet metal pan open at each end and having upturned sides with the bottom contour of the pan corresponding to that of one of the stave sides, tongue and groove sticks mounted longitudinally within the pan along the upturned sides thereof, one of said sticks presenting a convex face toward the pan center line, and the other a concave face, guide rods secured to opposite sides of the pan on the outside thereof and projecting beyond the ends thereof, an end gate mounted on said rods at each end of the pan and slidable lengthwise thereof toward and away from the pan ends, and means for clamping the end gates against the ends of the pan, said clamping means including a hand nut and a pivoted spacer interposed between the hand nut and the end gate.

2. A mold for making cement silo staves and the like, comprising a sheet metal pan open at each end and having upturned sides with the bottom contour of the pan corresponding to that of one of the stave sides, tongue and groove sticks mounted longitudinally within the pan along the upturned sides thereof, one of said sticks presenting a convex face toward the pan center line, and the other a concave face, guide rods secured to opposite sides of the pan on the outside thereof and projecting beyond one end thereof, an end gate mounted on said rods and slidable lengthwise thereof toward and away from the adjacent pan end, and means for clamping the end gate against said adjacent end of the pan, said clamping means including a spacer pivoted to the end gate, and a quick takeup device on one of said projecting rods for cooperating with said spacer.

3. A mold for making cement silo staves and the like, comprising a sheet metal pan open at each end and having upturned sides with the bottom contour of the pan corresponding to that of one of the stave sides, tongue and groove sticks mounted longitudinally within the pan along the upturned sides thereof, one of said sticks presenting a convex face toward the pan center line, and the other a concave face, guide rods secured to opposite sides of the pan on the outside thereof and projecting beyond the ends thereof, an end gate mounted on said rods at each end of the pan and slidable lengthwise thereof toward and away from the pan ends, means for clamping the end gates against the ends of the pan, said clamping means including a hand nut and a pivoted spacer interposed between the hand nut and the end gate, and a central guide rod extending beneath the central area of the pan to serve as a reinforcement therefor, and having a sliding fit within aligned openings in the end gates.

4. A mold for making cement silo staves and the like, comprising a sheet metal pan open at each end and having upturned sides with the bottom contour of the pan corresponding to that of one of the stave sides, guide rods secured to opposite sides of the pan on the outside thereof and projecting beyond the ends thereof, an end gate mounted on said rods at each end of the pan and slidable lengthwise thereof toward and away from the pan ends, and means for clamping the end gates against the ends of the pan, said clamping means including a hand nut and a pivoted spacer interposed between the hand nut and the end gate.

WILLIAM D. RICH.

REFERENCES CITED

The following references are of record in the file of this patent:

UNITED STATES PATENTS

| Number | Name | Date |
| --- | --- | --- |
| 765,350 | Wilson | July 19, 1904 |
| 822,524 | Kaiser | June 5, 1906 |
| 847,312 | Buckholder | Mar. 19, 1907 |
| 1,084,355 | Moore | Jan. 13, 1914 |
| 1,277,674 | Williams | Sept. 3, 1918 |
| 1,460,232 | Ditto | June 26, 1923 |
| 1,992,302 | Fels | Feb. 26, 1935 |
| 2,061,137 | Bowen | Nov. 17, 1936 |